Jan. 8, 1957 V. O. BOWLES ET AL 2,776,876
REACTOR CHAMBER WITH INTERNAL COLLECTORS
Filed Jan. 12, 1953 3 Sheets-Sheet 2
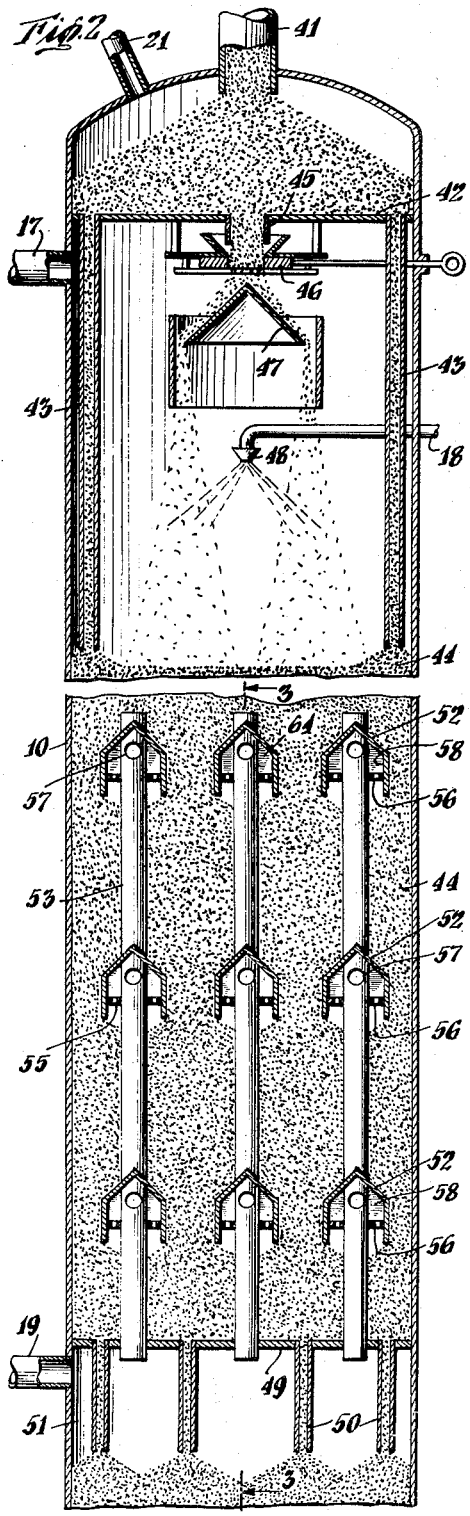
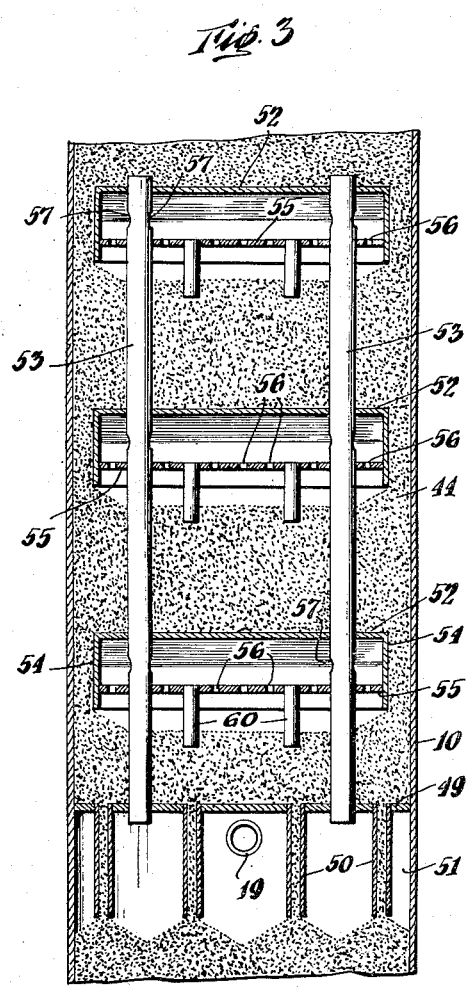
INVENTORS
Vernon O. Bowles
Louis P. Evans
BY
Andrew L. Jabriant
AGENT

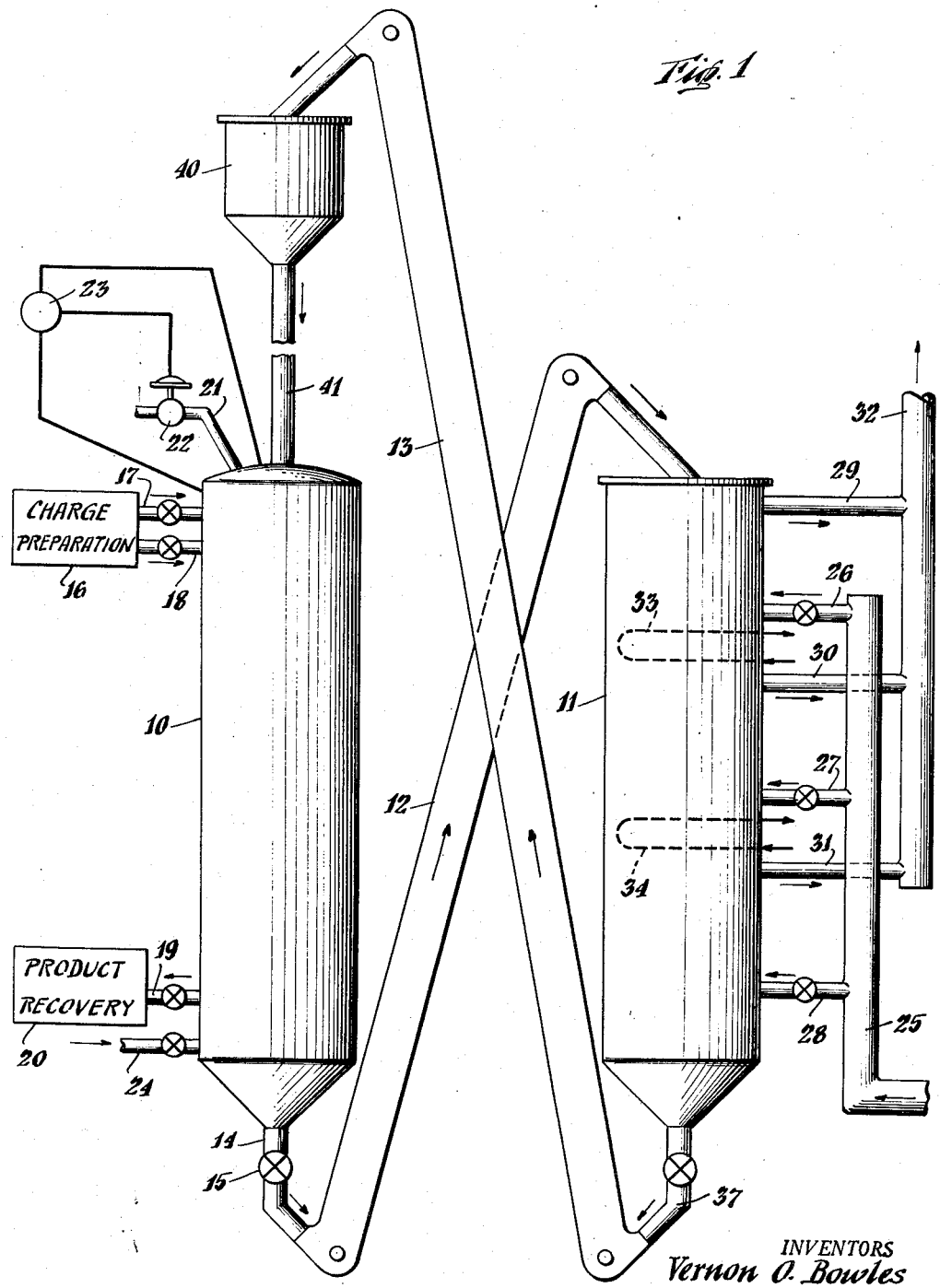

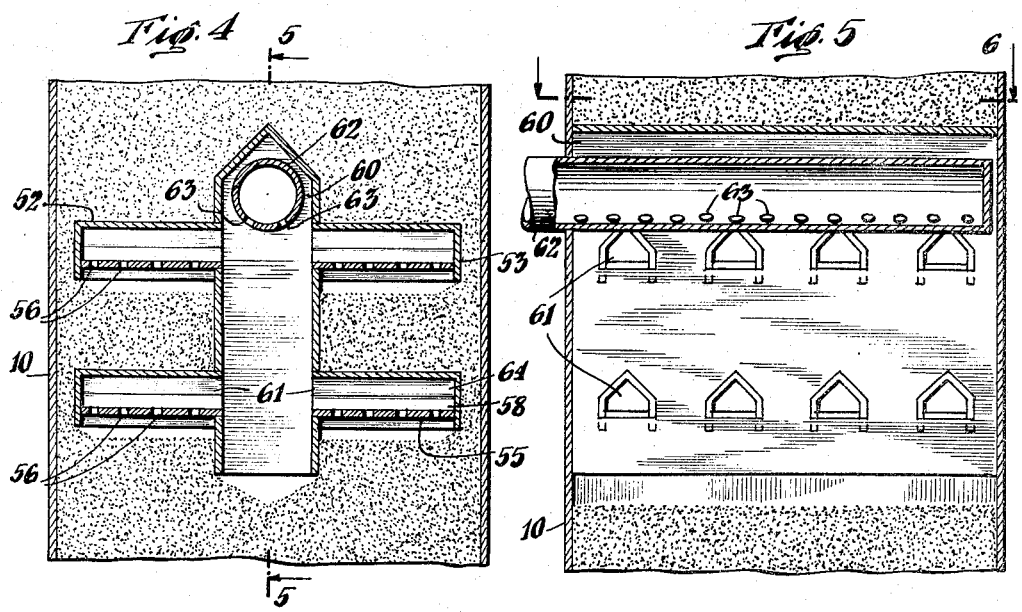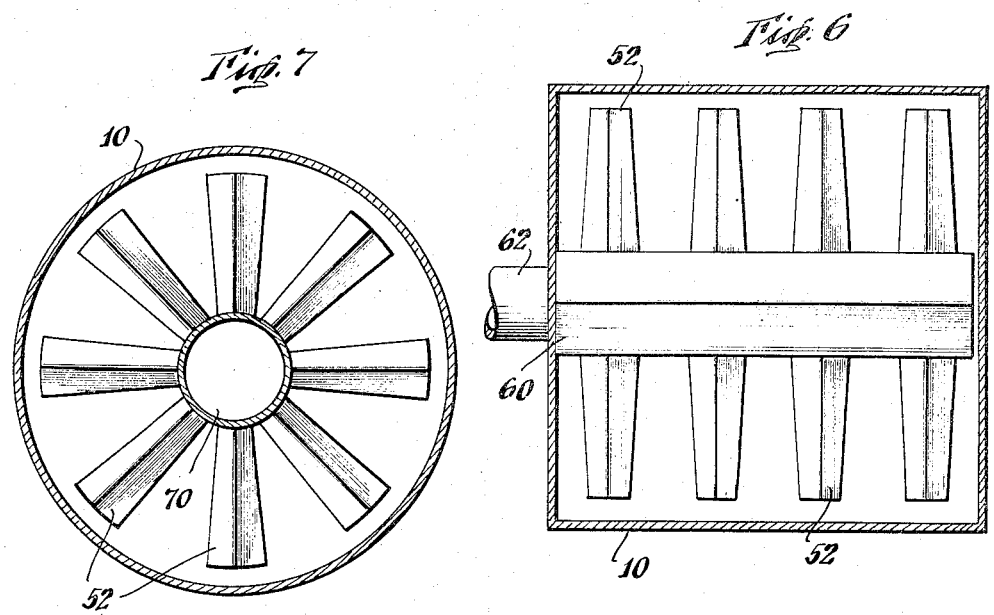

United States Patent Office 2,776,876
Patented Jan. 8, 1957

2,776,876

REACTOR CHAMBER WITH INTERNAL COLLECTORS

Vernon O. Bowles, Rye, N. Y., and Louis P. Evans, Woodbury, N. J., assignors to Socony Mobil Oil Company, Inc., a corporation of New York Application January 12, 1953, Serial No. 330,804

1 Claim. (Cl. 23—288)

This invention has to do with a method and apparatus for the conversion of fluid reactants, particularly fluid hydrocarbons, in the presence of a granular contact material which may or may not be catalytic in nature.

Exemplary of the processes to which this invention may be applied are the catalytic cracking, hydrogenation, dehydrogenation, aromatization, polymerization, alkylation, isomerization, reforming, treating or desulfurization of selected hydrocarbon fractions in the presence of a granular catalyst and the thermal cracking, viscosity breaking and coking of hydrocarbon fractions in the presence of a granular inert solid. Also exemplary are catalyst regeneration processes, gas purification and gas-solid heat exchange.

Typical of such processes is the catalytic cracking conversion of hydrocarbons, it being well known that high boiling fluid hydrocarbons may be converted to lower boiling gaseous, gasoline containing, hydrocarbon products by exposure to a suitable adsorbent type catalytic material at temperatures of the order of about 800° F. and higher and at pressures usually above atmospheric. Such a process has been developed commercially into a continuous cyclic process wherein the solid catalyst is passed cyclically through a conversion zone wherein it is contacted with fluid hydrocarbons to effect the conversion thereof and through a regeneration zone wherein it is contacted with a combustion supporting gas, such as air, which acts to burn off from the catalyst a carbonaceous contaminant deposited thereon in the conversion zone.

This invention is particularly concerned with such cyclic conversion processes or gas-solid contacting processes wherein the particle-form contact material moves through the conversion zone or contacting zone as a substantially compact column and wherein gaseous reaction products or contacting gas and the used contact material are separately withdrawn from the conversion or contacting zone.

In such cyclic processes wherein the contact material is a catalyst, it may partake of the nature of natural or treated clays, bauxite, inert carriers upon which catalytic materials such as metallic oxides have been deposited or certain synthetic associations of silica, alumina, or silica and alumina, to which small amounts of other materials such as metallic oxides may be added for special purposes. In the processes wherein the contact material is not catalytic in nature, its purpose is usually that of a heat carrier and may take any of a number of forms, for example, spheres or particles of metals, stones or refractory materials, such as mullite, zirkite, or corhart material or particles of coke. The contact material should be within the size range 1 inch to 100 mesh, and preferably 4 to 20 mesh by Tyler standard screen analysis.

In such processes, for example, the conversion of fluid hydrocarbons, wherein the fluid reactants pass downwardly through the conversion or contacting zone concurrently with the contact material bed, a serious difficulty arises in the withdrawal of the gaseous products from the contact material bed to the exterior of the contacting zone. Processes of the aforementioned types are generally characterized by high rates of gas flow through the conversion zone. Unless sufficient disengaging area is provided within the contact material bed to separate the gaseous material from the bed, an excessive amount of contact material will be carried out of the reaction zone with the gaseous product. One commercially successful method of accomplishing this is to provide a plurality of inverted, horizontally extending, gas collector troughs at a plurality of vertically spaced levels in the lower section of the contact material bed. Gas collects under these troughs and then passes through a flow-restricting orifice into a pipe which extends downwardly into a plenum chamber therebelow. This system is described and claimed in U. S. Patent No. 2,459,096 to Frederick E. Ray. While this system represented a major advance over the prior art, it is not absolutely perfect. For example, there is a tendency for small differences in static pressure to exist across the compact bed in processes to which this system is applicable. The flow control orifices in the pipes of the Ray system help to overcome any inequality in the rates of disengagement at various points in the bed where the pressure drop across the flow-restricting orifices is made substantially greater than the static pressure differential across the bed. However, since these collector troughs may be quite long, it then becomes necessary, in the system of Ray, to provide a large number of pipes with orifices for any given channel to avoid a substantial pressure gradient over the length of the channel with resultant inequality of disengagement. Thus, in a typical catalytic conversion reactor, the longest collector trough might use 8 pipes and there might be a total of 160 pipes required in the whole disengagement system. Obviously, from economical considerations and in the interest of simplicity, it would be desirable to eliminate as many of these pipes as possible consistent with uniform disengagement. In addition, in this type system, there is a tendency for the sides of the collectors to warp over the course of time, which obviously leads to non-uniform disengagement.

A major object of this invention is to provide a method and apparatus for removing gaseous material from a compact bed of granular contact material which overcomes the above-described difficulties.

Another object of this invention is to provide an efficient and economical method and apparatus for the disengaging of gaseous material from a compact bed of granular contact material.

Another object of this invention is to provide, in a system for disengaging gases from compact contact material beds wherein a plurality of vertically spaced inverted troughs are used to perform the disengagement, an improved method and apparatus for withdrawing the gases from each trough which enables each trough to be used to its maximum capacity.

Another object is to provide an efficient, economical method and apparatus for the conversion of fluid reactants, particularly fluid hydrocarbons, to gaseous products in the presence of a moving mass of granular contact material.

These and other objects of this invention will be apparent from the following discussion. In this discussion and in claiming this invention, the terms "gas," "gaseous," and the like, are used to refer to a material in the gaseous phase under the existing conditions of temperature and pressure, regardless of what may be its state under normal atmospheric conditions.

In this invention a moving, substantially compact bed of contact material gravitates through a conversion zone within a confined conversion or reaction vessel. Contact material is supplied to the upper section of this bed and removed from its lower section. A plurality of elongated, horizontally extending, inverted, gas collector troughs are provided in the lower section of the bed at a plurality of vertically spaced levels. Each of these troughs encloses a contact material-free space. Fluid reactants are supplied to the bed at a level above the troughs and pass downwardly. Across each trough is a partition with a plurality of orifices therethrough. These orifices are sized so as to impose a substantial flow restriction on the gas flowing upwardly into the trough. The size of these orifices increases progressively at successively lower levels. Gas is removed from the upper portion of the space above the partition by means of at least one passage which offers less resistance to total gas flow than the orifices which it serves.

This invention will be best understood by referring to the attached drawings, of which Figure 1 is an elevational view of a typical cyclic hydrocarbon conversion system to which this invention is applicable, Figure 2 is an elevational view, partially in section, of a hydrocarbon conversion vessel to which one form of this invention has been applied, Figure 3 is a sectional view along line 3—3 of Figure 2, Figure 4 is an elevational view, partially in section, of a modified form of this invention applied to a hydrocarbon reactor, Figure 5 is a sectional view along line 5—5 of Figure 4, Figure 6 is a sectional view along line 6—6 of Figure 5, and Figure 7 is a sectional view, similar to Figure 6, of a further form of this invention.

All of these drawings are diagrammatic in form and like parts in all bear like numerals.

Turning now to Figure 1, there is shown a conversion vessel 10, a regeneration or revivification vessel 11 and conveyors 12 and 13 for transfer of contact material between the conversion and regeneration vessels. In operation, particle-form contact material is supplied from hopper 40 through gravity feed leg 41, or other feed device, into the upper section of the conversion vessel 10. Used contact material is withdrawn from the lower end of vessel 10 through drain conduit 14. The rate of contact material flow is controlled by valve 15 on conduit 14, so that a substantially compact column of contact material is maintained within the conversion zone. The hydrocarbon charge to vessel 10 may exist in the gaseous phase or liquid phase, or both. The charge may be vaporized and/or heated and separated into vapor and liquid fractions in a suitable charge preparation system 16, which may be of conventional design. Heated charge vapors may be admitted to the upper section of the conversion zone through conduit 17, and heated liquid charge may be admitted through conduit 18. Gaseous conversion products are withdrawn separately fom the contact material from the lower section of the conversion zone through conduit 19, through which they pass to a conventional product recovery system 20. An inert seal gas, such as steam or flue gas, may be admitted through conduit 21 into a seal zone maintained at the upper end of vessel 10 for the purpose of preventing hydrocarbon escape through the gravity feed leg. The rate of seal gas introduction may be so controlled by means of diaphragm actuated valve 22 and differential pressure control instrument 23 as to maintain a seal gas pressure in the seal zone slightly above the hydrocarbon pressure in the upper section of the conversion zone. An inert purge gas, such as steam or flue gas, may be introduced into the contact material column through conduit 24 below the level of gaseous product withdrawal for the purpose of purging gaseous reaction products from the outflowing used contact material. The used contact material is transferred by conveyor 12, which may be a continuous bucket elevator or gas lift, for example, to the upper end of regeneration vessel 11. The regeneration vessel shown is of the multi-stage type, well adapted for the regeneration of spent cracking catalyst. Air or oxygen containing gas is introduced from manifold 25 into several superposed burning stages through inlet conduits 26, 27 and 28. Flue gas may be withdrawn from these stages through conduits 29, 30 and 31, all connecting into outlet manifold 32. The contact material temperature may be controlled by passing a suitable cooling fluid through cooling tubes 33 and 34 located in vessel 11 between the burning stages. Regenerated contact material is withdrawn from vessel 11 through drain conduit 37, through which it passes to conveyor 13. The hot, regenerated contact material is transferred by conveyor 13 to reactor supply hopper 40. While the regenerator described hereinabove is of the multi-stage type, it will be understood that other types of regenerators adapted for regenerating contact materials, such as those used with higher contact material circulation rates, may be employed within the scope of this invention. The type of regenerator or revivification vessel to be employed will vary depending upon the particular process involved. Any apparatus adapted to condition the contact material to a state satisfactory for re-use in the particular conversion process involved is contemplated to be within the scope of this invention. It should be further understood that this invention is not considered as limited to any particular positioned arrangement of conversion and regeneration vessels or to be the particular apparatus described hereinabove for contact material introduction into the conversion vessel.

Turning now to Figures 2 and 3, which are best considered together, these figures illustrate the intervals of the upper and lower sections of the reactor in Figure 1. Granular contact material gravitates into the upper end of vessel 10 through conduit 41. A confined seal zone is maintained in this upper end above a transverse partition 42. Contact material accumulates therein and seal gas is supplied thereto through conduit 21. Contact material gravitates downwardly from the seal zone as a plurality of substantially compact streams through pipes 43 onto the surface of a downwardly gravitating, substantially compact bed of contact material 44. Contact material also gravitates from the seal zone through central conduit 45. This contact material passes through a slide valve 46, normally kept open, onto the surface of a conical baffle 47. The contact material passes over baffle 47 and is spread outwardly by the baffle and drops from the lower edge thereof to form a tubular shower of freely falling contact material particles which drop onto the compact bed 44. Liquid or mixed phase hydrocarbons are sprayed into the shower from a spray device 48, or other distributing device, which is supplied by means of a passage 18. Vaporized hydrocarbons may be supplied through passage 17. Hydrocarbons pass downwardly through bed 44 and are converted to gaseous products.

Extending transversely across the lower section of the reactor is a partition 49. A plurality of contact material pipes 50 extend downwardly a substantial distance below partition 49 so as to define a contact material-free plenum space 51. Within the lower section of the reaction bed 44, immediately above partition 49, are a plurality of inverted, gable-roofed, horizontally-extending, gas collector troughs or channels 52. These channels are arranged on a plurality of vertically spaced-apart levels. In the apparatus of Figures 2 and 3, troughs are provided at three vertical levels and three channels are provided on each level. The channels are superimposed one above the other, so that a riser pipe 53, closed on its upper end, can extend vertically downwardly through three channels, one in each row, into plenum space 51. Each channel has two riser pipes extending therethrough for purposes of support. The ends of troughs 52 are closed against gas flow by plates 54. A transverse partition 55 extends across each of troughs 52 at a level therein, which is substantially below the upper end of the trough and substantially above the lower edges of the trough. Each partition is equipped with a plurality of uniformly spaced-apart orifices 56 along its length. These orifices are less than 18 inches apart and preferably less than 12 inches apart, and are sized to restrict the flow of gases into the upper section of the trough, and the total area of the orifices in the troughs at each level progressively increases at successively lower levels for reasons explained hereinbelow. Each riser pipe is equipped with two openings 57 which communicate with the upper portion of each trough through which the pipe passes. The total area of all of the openings 57 in communication with any given trough 52 is greater than the total area of all the orifices 56 in the partition 55 of that trough, so that there will be substantially less resistance to flow through openings 57 than through orifices 56 for any given trough.

In the operation of the gas disengaging section of this reactor, it is apparent that each of troughs 52 encloses a contact material-free space 58. The gaseous products pass downwardly around any given trough and then upwardly into the space 58 thereabove. A flow restriction is imposed on the upwardly flowing gaseous products by orifices 56. Gaseous material passes through these orifices into the upper section 64 of space 58 above partition 55. Gaseous material then flows laterally through upper section 64 of space 58 above partition 55 and into pipes 53 through openings 57. The gaseous material flows downwardly through the pipes into plenum space 51 and is withdrawn from the plenum space by passage 19. It has been found that the orifices 56 in plate 55 must be carefully designed so as to provide for the maximum amount of gas disengagement from bed 44 while avoiding excessive carry-over of contact material through orifices 56. When there is no flow of gaseous material through bed 44, the contact material beneath each of troughs 52 will assume its normal angle of repose. This angle is normally within the range 25 to 40 degrees with the horizontal, and for most commercially used contact materials, is about 30 degrees. When gas flows through the bed 44 and is withdrawn from the channels 52, it has been found that the contact material will rise above its normal angle of repose to a level under any given trough which is dependent not only on the amount of gas being withdrawn under the particular trough, but also on the amount of gas which is flowing past the trough. For any given type of trough there is a maximum limit on the amount of contact material rise under the trough which can be tolerated without excessive contact material carry-over. For example, in the gable-roofed type of trough shown, a contact material rise of 3 inches under the trough is usually the maximum permissible rise without encountering excessive carry-over. Considering again the arrangement of Figure 3, when gas is being withdrawn from the lower row of troughs 52, the contact material rise under any one of these troughs will be proportional only to the amount of gas being withdrawn by means of the trough, since no gas flows past these troughs. With the second row of troughs, the rise underneath the troughs will be affected not only by amount of gas withdrawn by the trough but also by the amount of gas which flows by the trough next below. Thus, if a given rise can be tolerated in any trough, the troughs in the intermediate row will have less capacity for gas removal than the troughs in the lower row. With a trough in the upper row, the contact material rise is affected by the gas withdrawn through the trough and by the gas which flows by the next two troughs below. Thus, a trough in the upper row will have the least capacity for gas withdrawal of any of the three. Therefore, it becomes necessary to arrange the sizes of the orifices 56, so that there is a decreasing total area of the orifices at successively higher levels, the lower troughs, with maximum capacity, having the largest orifices and the upper troughs, having minimum capacity, the smallest. Any contact material which is entrained in the gas streams flowing through orifices 56 will settle out in the upper portion of the trough and can be returned to the bed 44 through pipes 60 which extend from partition 53 downwardly to a level below the contact material surface underneath each trough. These pipes should extend a substantial distance below this contact material surface and preferably should extend a distance of at least 18 inches below a surface which is formed by planes at angles with 30 degrees with the horizontal extending from the edges of each trough 52.

It is readily apparent by this invention that the large number of pipes required to service each collector channel in the prior art systems is avoided. By providing the flow orifices in the transverse partition 55 rather than in the pipes 53, only one such pipe is actually needed to service any row of superimposed troughs. Two pipes are shown in Figures 2 and 3 merely for support purposes, and one of these could be eliminated if other types of support means were provided for the channels. The use of partition 55 has the additional advantage of increasing the structural rigidity of troughs 52, so that there is less tendency for warpage of the troughs. In this invention there will be fewer pipes 53 than there are orifices 56.

Turning now to Figures 4, 5, and 6, there is illustrated therein a modified form of gas collector of this invention. A central vertically extending gas plenum channel 60 is situated within the lower section of rectangular conversion vessel 10. This channel is closed on top but open on the bottom. A plurality of horizontally extending, inverted, gas collecting troughs 52 extend outwardly from the sides of channel 60. These troughs are closed on their outer ends by plates 53. Extending across each of troughs 52 is a partition 55 which is substantially below the upper end but substantially above the lower end of the trough. Each of these partitions is equipped with a plurality of flow-restricting passages or orifices 56. These orifices are uniformly spaced apart at intervals of less than 18 inches and preferably less than 12 inches. The inner end of troughs 52, above the level of partition 55, opens into a plenum channel 60 through openings or passages 61. Each opening 61 is of greater area than the total area of the orifices 56 in the trough which it serves. A conduit 62 extends horizontally across plenum channel 60 and outwardly through the wall of vessel 10. This conduit is equipped with a plurality of spaced-apart openings 63. The operation of this modification is much the same as that previously described. Gases flow inwardly into the space 58 within the channels 52 and upwardly through the flow-restricting orifices 56. Orifices 56 are progressively larger at successively lower levels. The gas then flows laterally in the upper section 64 of space 58 above partition 55 into the plenum channel 60. The plenum channel is of sufficient volume that the velocity of the gas is substantially reduced as it enters the channel and any entrained contact material drops out and onto the contact material surface at the bottom of the channel. The gaseous products then pass from a channel through openings 63 into pipe 52, by means of which the product is removed from the system. Openings 63 are so sized that they create a substantially greater pressure drop therethrough than that across pipe 62 so as to promote uniform withdrawal of the gaseous material; however, these openings have a greater total area than the total area of all the orifices 56 in the partitions 55 of all the troughs 52. It is not necessary to this modification that pipe 62 with openings 63 extend all the way across the plenum chamber 60 but pipe 62 may, if desired, terminate at the wall of vessel 10. Troughs 52 are tapered inwardly in the direction of lateral gaseous product flow to permit vapor flow at negligible pressure drop. Otherwise, the increasing pressure drop near the central plenum chamber might cause disproportionate disengaging of the vapors with more of the gaseous product being removed at or near the central plenum chamber. It is not necessary to this invention, however, that the troughs be so tapered.

A different type of central plenum chamber is shown in Figure 7. There, the chamber consists of a central cylinder 70, from which troughs 52 extend radially. These troughs are equipped with partitions and orifices of the type previously described. Troughs 52 in this case are larger at their outer ends than their inner ends, because the outer ends serve a greater area of the contact material bed. More orifices may be provided in the transverse partition at the outer ends of these troughs than at the inner end for this same reason.

It will be apparent from the foregoing description of this invention that it differs from prior art systems in that the rate of disengagement under any given trough is controlled within the space under the trough prior to the time the gas reaches the outlets from the trough, rather than controlling the rate of gas disengagement at the trough outlet with the attendant disadvantages described above.

The troughs used with this invention may be of either straight or annular shape and should be of substantial length and arranged in a vessel in two or more vertically spaced rows. The troughs in various rows may be located one above the other or may be staggered. The troughs should be spaced vertically a certain critical distance to avoid a marked decrease in efficiency in the upper troughs. This is best expressed as the vertical distance between the lower end of any given trough and the highest level having maximum horizontal area on the trough next below (this last would be the base of the gable-roof for the type of trough shown in the attached drawings). This distance should be greater vertically than the distance $d$ as determined by the following equation:

$$d = \frac{W}{2} \tan b$$

in which W is the maximum width of the collecting member below the given member and $b$ is the characteristic angle of internal flow of the particular contact material in use. For most commercially used contact materials, $b$ will be within the range 67 to 78 degrees and it will usually be 75 degrees. It is preferable that this vertical spacing be greater than $d$ by an amount at least equal to $$\frac{W'}{2} \tan C$$

where W' is the width of the upper trough at its base and C is the angle of repose of the contact material. Expressed in another way, the vertical distance between the lower end of any given trough and the highest level having maximum horizontal area of the trough next below should be equal to or at least as great as $$d = \frac{W}{2} \tan b + \frac{W'}{2} \tan C$$

or when the members are of the same construction $$d = \frac{W}{2} (\tan b + \tan C)$$

Since the contact materials usually used in hydrocarbon conversion processes have an angle of internal flow of about 75 degrees and angle of repose of about 30 degrees, it may be said for gable-roofed troughs of the same width that the distance from the bottom of the gable-roof of the lower trough to the lower end of the upper trough should be equal or at least as great as 2.1 times as great as the trough width.

The method and apparatus of this invention may be employed in a wide variety of processes involving contact of gas with a column of particle-form solid material. The invention is particularly applicable to catalytic processes for the cracking conversion of liquid or vaporous hydrocarbon charges or both. In general, such hydrocarbon conversion operations are conducted under temperatures within the range about 800° F. to 1100° F., the higher temperatures being employed for liquid charging stocks. Low pressures of the order of 5 to 30 pounds per square inch are generally employed in the conversion zone for cracking conversions but may range much higher for other processes; for example, about 200 pounds per square inch for catalytic reforming. The oil charge space velocity may vary from about 0.3 to 10.0 volumes of oil (measured as liquid at 60° F.) per hour per volume of catalyst column within the reaction zone. The catalyst to oil throughput ratio may vary within the range about 1 to 20 parts of catalyst per part of oil by weight. In general, the reactant charge is preheated to a temperature of the order of 600° F.–900° F. and all or part of the heat required for the conversion may be carried into the conversion zone in the catalyst.

As an example, in a typical hydrocarbon conversion process, the charge stock might be a reduced petroleum crude while the contact material could be a synthetic silica-alumina catalyst. This charge might be supplied to the reaction zone at a temperature of about 790° F. as a mixture of liquid and vapor, while the catalyst could be supplied at about 1030° F. so as to supply the heat required by the conversion reaction. Catalyst might be supplied at about 315 tons per hour, while the petroleum charge could be supplied at the rate of 18,000 bbls. per day. The catalyst reaction bed could be about 16 feet in diameter and 10 feet high.

It should be understood that it is intended to cover herein all changes and modifications of the examples of this invention chosen for purposes of disclosure which do not constitute departures from the spirit and scope of the invention.

We claim:

An apparatus for the conversion of fluid reactants in the presence of a moving mass of granular contact material, which comprises in combination: an enclosed reaction vessel adapted to confine said moving mass; members defining a passageway for the supply of contact material to the upper section of said vessel and members defining a passageway for the removal of contact material from the lower end of said vessel; means for supplying fluid reactant to the upper section of said vessel; a plurality of elongated horizontally extending inverted gas collector troughs at a plurality of vertically spaced apart levels within the lower section of said vessel; solid members closing the ends of said troughs against the entry of gas from said vessel; a partition extending horizontally across the entire length of each of said troughs at a level intermediate the top and bottom of each of said troughs, thereby defining an enclosed gas space in the upper section of each trough, each of said partitions having a plurality of orifices therethrough located at uniformly spaced intervals no greater than 18 inches apart along the length of each partition to permit throttled gas entry into the gas space in the upper section of the trough from the surrounding vessel, the total area of all of said orifices at each level within said vessel progressively increasing at successively lower levels; at least one conduit for the return of entrained contact material from said gas space to the surrounding vessel extending tightly through each of said partitions and terminating at a level a substantial distance below the lower edges of the trough from which it extends but above the upper ends of the trough next below; a gas plenum chamber beneath the lowermost of said troughs; at least one pipe extending from each of said troughs into said plenum chamber, said pipe connecting with the gas space in the upper end of said trough by means of at least one opening in said pipe, the total area of said opening being greater than the total of all of the orifices in the partition which forms the underside of the gas space from which the pipe extends, whereby said orifices act as the flow throttle in the disengaging system; and means for removing gaseous material from said plenum chamber.

References Cited in the file of this patent

UNITED STATES PATENTS

| | | |
|---|---|---|
| 2,458,498 | Bergstrom | Jan. 11, 1949 |
| 2,493,235 | Dunham | Jan. 3, 1950 |
| 2,499,305 | Fahnestock | Feb. 28, 1950 |
| 2,625,467 | Barker | Jan. 13, 1953 |
| 2,636,805 | Lassiat et al. | Apr. 28, 1953 |